United States Patent [19] [11] 4,285,998
Thibodeau [45] Aug. 25, 1981

[54] REINFORCED THERMOPLASTIC FILM SHEET

[75] Inventor: Raymond J. Thibodeau, Wayzata, Minn.

[73] Assignee: Conwed Corporation, St. Paul, Minn.

[21] Appl. No.: 902,490

[22] Filed: May 3, 1978

Related U.S. Application Data

[63] Continuation of Ser. No. 708,338, Jul. 26, 1976, abandoned.

[51] Int. Cl.³ .......................... B32B 1/04; B32B 3/10
[52] U.S. Cl. ...................................... 428/35; 428/110; 428/112; 428/138; 428/192; 428/195
[58] Field of Search ................. 428/35, 112, 167, 138, 428/139, 140, 192, 195, 110; 156/272; 229/55

[56] References Cited
U.S. PATENT DOCUMENTS

| 3,365,352 | 1/1968 | Van Burleigh et al. | 428/135 |
| 3,405,027 | 10/1968 | Wyckoff | 229/55 |
| 3,482,567 | 12/1969 | Franklin | 428/255 |
| 3,762,983 | 10/1973 | Osborn | 428/112 |
| 3,973,063 | 8/1976 | Clayton | 156/272 |

Primary Examiner—Paul J. Thibodeau
Attorney, Agent, or Firm—Eyre, Mann, Lucas & Just

[57] ABSTRACT

A reinforced thermoplastic lightweight film sheet is disclosed in which a lightweight plastic net or net-like product is freely sandwiched between at least two layers of lightweight thermoplastic film. The net is freely movable with respect to the film layers except along selected strips where at least the plastic film layers are bonded together fixedly securing the net threat therebetween. The reinforced sheet is especially useful as bagging material where it exhibits increased burst strength and rupture resistance and reduced elongation and creep.

13 Claims, 3 Drawing Figures

REINFORCED THERMOPLASTIC FILM SHEET

This is a continuation of application Ser. No. 708,338, filed July 26, 1976, abandoned.

The present invention relates to lightweight reinforced thermoplastic film sheets, especially low density polyethylene film sheets.

Film sheets have found wide usage in a number of industries. For example, thermoplastic film is widely used to bag chemical products and in the bagging industry in general for trash bags, storage bags, etc., for home and industrial use. However, because of the inherent tendency of the film to stretch or creep under tensile loading with elongation of up to 550%, and the poor burst strength and rupture resistance of bags made from the film, especially from the lightweight film, there are many applications where known bags of film sheet are unuseable. Where thermoplastic film is used to bag products, such as chemicals, in heavy packages, such as about 50 pound bags, elongation, poor burst strength and rupture resistance are especially objectionable since they severely limit the height to which the bags may be stacked. Presently, using two layers of 3-4 mils thick film to bag 50 pounds of chemical product, the bags may only be stacked five bags per pallet high and only two pallets high before the bags become unuseable because of bursting and the like. Similarly, the severe elongation of lightweight plastic films makes use of the films objectionable for many applications in which the film is subjected to tensile forces. It would, therefore, be desirable to find a way to use the film while maintaining its light weight and flexibility. In this respect, reinforcing the plastic sheet by increasing its thickness is objectional since the ultimate sheet would have to be quite thick in order to impart substantial additional strength to the sheet and this is undesirable both from an economic point of view and because of the fact that a thick sheet will abort the desirable properties of flexibility, light weight and low density. In U.S. Pat. Nos. 3,649,405 and 3,762,983, it is taught to increase the tear resistance of heavy plastic films for use, for example, in the construction industry by fixedly laminating a net-like product between the film layers in which the film layers are adhered together through the openings in the net-like product. Movement of the net-like product is physically constrained by the bonding of the film through the openings in the net-like product. The product disclosed in these patents is quite expensive to make since it requires bonding of the plastic sheet at each interstice of the net. In addition, these patents are not concerned with burst strength, elongation and the like as evidenced by the fact that the diamond and square mesh nets are taught to be interchangeably utilizable.

In accordance with the present invention the prior art disadvantages are overcome and additional advantage realized by forming a reinforced sheet which possesses increased burst strength, rupture resistance and tensile strength and in which elongation of the reinforced sheet is limited to as low as about 10%.

The present invention is embodied in and carried out by a reinforced plastic sheet in which a plastic net-like product is freely sandwiched between at least two plastic film layers except along selected strips of the reinforced sheet positioned at least along the perimeter, circumference or periphery of the reinforced sheet wherein the plastic film layers are at least bonded to each other fixedly securing the net-like product therebetween. Preferably, the net-like product and the plastic film layers are also bonded to each other within the selected strips. Bonding is preferably accomplished by heat sealing. The film is preferably polyethylene and the net is preferably polypropylene.

The reinforcing net-like structures of the present invention are preferably flat thermoplastic nets with strands which are integrally extruded at the joints. Flat net-like structures are very much preferred because there are no raised joints which may interfere with heat sealing. Processes suitable for making these nets are taught for example according to U.S. Pat. No. 3,252,181 (FIGS. 1 & 12) and French Pat. No. 368,393 wherein a plurality of parallel longitudinal strands are extruded and a plurality of parallel transverse strands are integrally extruded therewith normal to the longitudinal strands at spaced intervals resulting in a product of uniform thickness throughout.

It is preferred that the thermoplastic reinforcing net be oriented after it is extruded. By orienting it is meant that the reinforcing net is heated and stretched at a temperature above its second glass transition temperature whereby the net takes a permanent stretch. Orienting the net increases its tensile strength. Apparatuses and methods for orienting net-like materials are well known in the art and are shown for example in British Pat. Nos. 1,235,901 and 905,252. As with the net, it is preferred that the film be biaxially oriented since this increases strength and enables the use of a thinner sheet of material. In typical bagging operations, the bag will have a wall thickness of about 8 mils, made from two plys of 4 mils each. The films of such bags will normally have a minimum elongation of 200% and will generally have elongation of 300% to 500% or more. In the present invention the same thickness is not required and it is possible to achieve the advantages of the present invention even with a total thickness as low as 5 mils, with one sheet suitably being 3 mils and the other suitably being 2 mils in thickness.

The dimensions of the net-like product are defined in terms of weight per thousand square feet (msf) and it is preferred that the net have a weight of about ½ pound msf to about 3 pounds msf, preferably about ¾ pound msf to about 2 pounds msf. Where there are two sets of strands, these nets will normally have from 5 to 40 strands per 10 inches in each direction. The nets preferably have an elongation of no greater than about 10% to about 50% and more preferably in the range of no greater than about 15% to about 30%. Such films and nets are readily available in the marketplace.

In the preferred form of the present invention, there are two sets of parallel strands which are extruded integrally with each other. However, it will be appreciated that the reinforcing nets according to the present invention could comprise more than two sets of strands.

These and other aspects of the present invention will be more apparent from the following description and drawings which illustrate the invention by way of example and in which like numerals refer to like parts.

Figure 1:
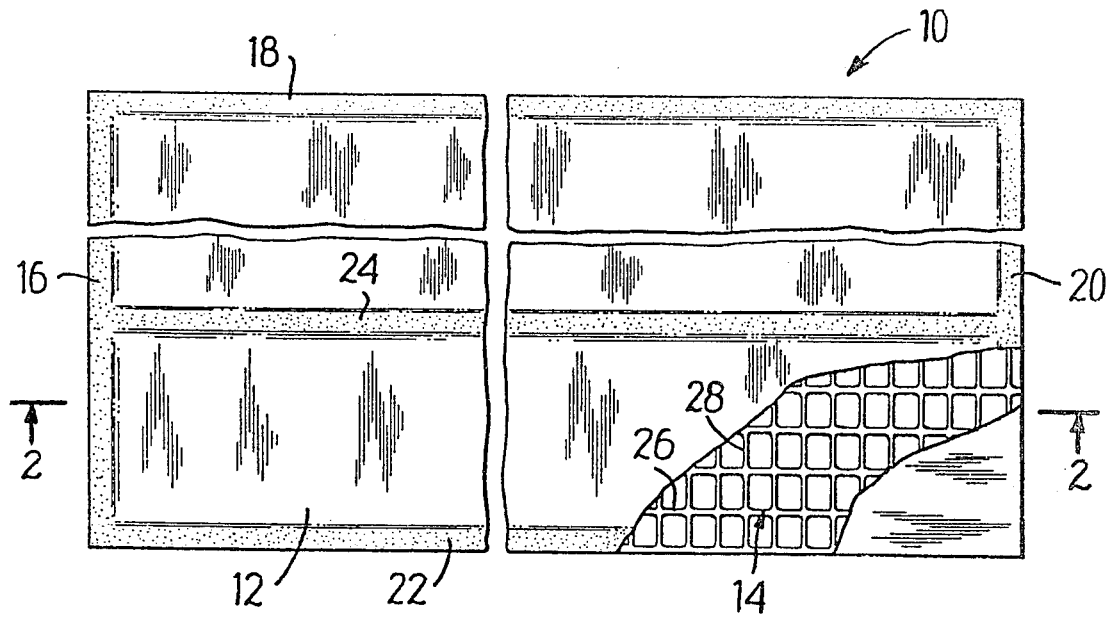
FIG. 1 shows a top view of the reinforced sheet according to the present invention.
Figure 2:
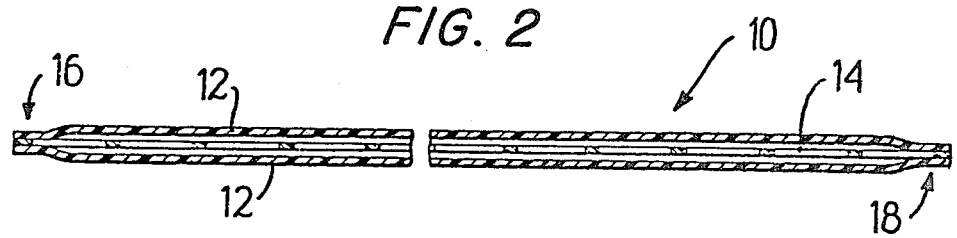
FIG. 2 shows a cross-sectional view of the reinforced sheet of FIG. 1.

Referring to FIGS. 1 and 2, a reinforcing sheet 10 according to the invention is shown comprising low density polyethylene film sheets 12 sandwiching polypropylene net 14. The net 14 is a rectangular mesh in which the strands meet at substantially right angles. The sheet 10 is formed by heat sealing the net and film layers along the sides 16, 18, 20, 22 (perimeters) thereof. Referring particularly to FIG. 2, where the net and film and the spaces therebetween are exaggerated for clarity, the net 14 is only secured at the edges of the sheet and is freely sandwiched therebetween. As shown, the film and net are bonded together by the heat seal. If desired, strips 24 which are located other than at the periphery may also be heat sealed. However, it is preferred that strips such as 24 run parallel to either the longitudinal strands 26 or transverse strands 28 of the net 14. Apparatus for forming the film, for forming the net, for positioning the film and net, and for heat sealing the film and net are known in the art.

Figure 3:
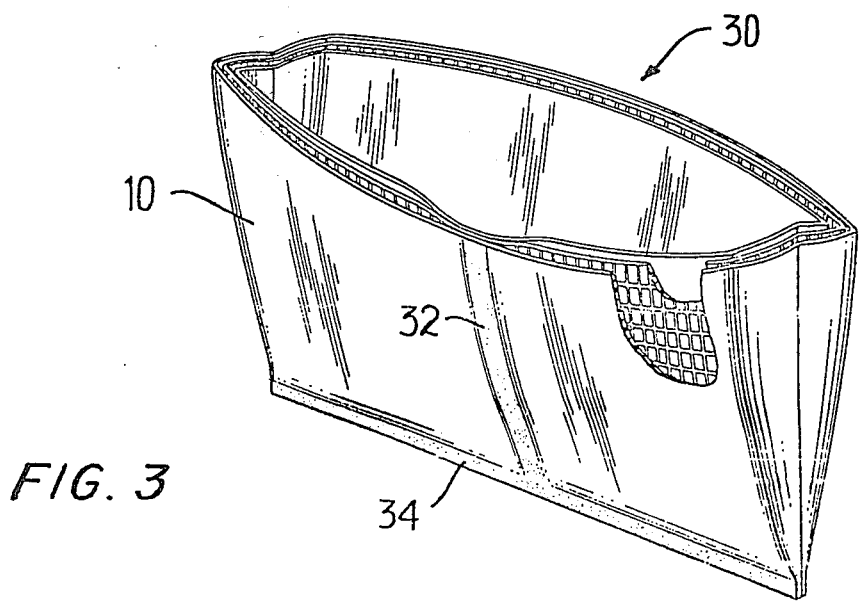
FIG. 3 is an isometric view of a reinforced sheet folded to form a bag according to the invention.

As described hereinbefore, the reinforced sheet is especially suited to be formed into a bag. Referring to FIG. 3, bag 30 is shown made from sheet 10. Bag 30 is formed by folding sheet 10 and heat sealing the ends thereof 32 and the bottom 34. The top is heat sealed after the bag has been filled. Apparatus for forming and heat sealing the bag as shown in FIG. 3 are known in the art. Folding and heat sealing in manners which differ from that shown in FIG. 3 and described herein will be apparent to those skilled in the art.

As described hereinbefore, reinforced sheets according to the invention exhibit superior elongation characteristics.

A comparison of elongation and tear resistance between plastic film and oriented plastic net may be made by referring to the examples set forth in the Tables below.

TABLE 1

| POLYETHYLENE FILM | | |
|---|---|---|
| Thickness (Mils) | 9 | 4.5 |
| Longitudinal Break Load (pounds/inch) | 25 | 14 |
| Transverse Break Load (pounds/inch) | 25.1 | 14.2 |
| Longitudinal Break Elongation (%) | 383 | 431 |
| Transverse Break Elongation (%) | 557 | 567 |

TABLE 2

| ORIENTED POLYPROPYLENE NET | | |
|---|---|---|
| Net Weight (pounds/1000 sq. ft.) | 1 | 3 |
| Net Thickness (Mils) | 3 | 3 |
| Longitudinal Strand Density (strands/inch) | 1.54 | 1.53 |
| Transverse Strand Density (strands/inch) | 1.33 | 1.33 |
| Longitudinal Break Load (pounds/inch) | 3.98 | 4.6 |
| [pounds/strand] | [2.59] | [3.0] |
| Transverse Break Load (pounds/inch) | 3.94 | 3.9 |
| [pounds/strand] | [2.97] | [2.93] |
| Longitudinal Elongation (%) | 32.9 | 39.3 |
| Transverse Elongation (%) | 15.4 | 15.3 |

It will be observed that while there was no improvement in tear resistance (longitudinal and transverse break load) of the net over the film, elongation of the net was more than approximately 36 (transverse direction) and 10 (longitudinal direction) times less than that of the film, even film which was three times thicker than the net. Similar improvements are obtainable when using a reinforcing sheet according to the invention and, secondarily, additional improvement in tear resistance will also be realized with the net-film combination. For example, with the reinforced sheet sandwich construction of the present invention, elongation is preferably maintained in the range of from about 10 to about 50% and is most preferably maintained in the range of from about 15 to about 30%. The corresponding range for plastic film can be from about 200 to about 550%, and is generally from about 300 to about 450%. In accordance with the present invention, bags made of the reinforced sheet which contain 50 pounds of chemical material are able to be stacked five bags per pallet high and five pallets high. This is an improvement of 250% over stacking of the prior art bags.

In addition to the single ply embodiment of the reinforced sheet described hereinbefore (single ply meaning a single sandwich of two plastic film layers sandwiching a single net layer), multiple ply embodiments of reinforced sheet may also be made. For example, instead of single film sheets sandwiching the net, double film sheets may be used. Moreover, additional film or net layers may be added to satisfy the requirements of varying applications. It is intended to cover these multiple ply embodiments which do not depart from the spirit and scope of the invention.

While the invention has been described with respect to preferred use of low density polyethylene film sheets, and polypropylene plastic nets, the principal feature of the present invention is to reduce the elongation and creep of a thermoplastic sheet by employing a sandwich construction with a net-like material as an interior reinforcement. It will therefore, be understood that the present invention may be employed with any thermoplastic sheet having an elongation greater than 200% by utilizing a net having an elongation of 50% or less. It is also intended to cover sheets of shapes other than those shown and described as the particular shape the reinforced sheet takes will depend upon the particular application.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. A bag capable of withstanding stresses over a period of at least about 4 months encountered in being stacked five pallets high with a height of five bags per pallet when each said bag contains 50 pounds of granular material, the walls of said bag being composed of a sandwich construction comprising:
   (a) inner and outer layers of a polyethylene film each said film having an elongation of at least about 200%;
   (b) a substantially flat plastic net-like structure intermediate said inner and outer walls, said structure;
      (i) having been formed by extruding a first set of space parallel longitudinal strands interconnected by a second set of spaced, parallel transverse strands extruded integral with said longitudinal strands, the first and second sets of strands meeting at substantially right angles;
      (ii) the extruded structure having been biaxially oriented by heating it and stretching it;
      (iii) weighing from about ½ pound per thousand square feet to about 3 pounds per thousand square feet;
      (iv) having an elongation of less than about 50%;
      (v) being of substantially uniform cross-section throughout both the strands and the joints thereof;

(c) portions of said inner and outer layers being bonded to each other along selected strips by heat sealing, one of said selected strips being an end seam;

(d) one said set of strands being aligned substantially parallel with said end seam and the other said set of strands being aligned substantially perpendicular thereto;

(e) other portions of said inner and outer layers being unbonded to each other over a continuous area of a plurality of strands of each said set of strands; whereby said structure is free to move with respect to said inner and outer layers in the unbonded area.

2. The bag of claim 1 wherein the strips are located about the periphery of the reinforced sheet.

3. The bag of claim 1 wherein the film is bonded by a heat seal.

4. The bag of claim 3 wherein the film layers are bonded to the net-like structure as well as to each other.

5. The bag of claim 1 wherein the film comprises polyethylene.

6. The bag of claim 1 wherein the net-like structure comprises polypropylene.

7. The bag of claim 1 wherein the film comprises polyethylene and the net-like structure comprises polypropylene.

8. The bag of claim 5 wherein the film thickness is from about 2 to about 3 mils.

9. The bag of claim 6 wherein the weight of the net-like structure is from about ¾ pound msf to about 2 pounds msf.

10. The bag of claim 9 wherein the net-like structure comprises polypropylene net of a thickness less than that of the film and a density approximately equal to that of the film.

11. The bag of claim 10 wherein the elongation of the reinforced sheet sandwich construction of walls is from about 10% to about 50%.

12. The bag of claim 10 wherein the tear strength of the reinforced sheet sandwich construction of walls is from about 1 to about 5 pounds per inch.

13. The bag of claim 10 wherein the net-like structure comprises from about 5 to 40 longitudinal strands per 10 inches and from about 5 to 40 transverse strands per 10 inches.

* * * * *